(12) United States Patent
Barbarossa et al.

(10) Patent No.: US 10,761,263 B1
(45) Date of Patent: Sep. 1, 2020

(54) MULTI-CHANNEL, DENSELY-SPACED WAVELENGTH DIVISION MULTIPLEXING TRANSCEIVER

(71) Applicant: II-VI Delaware, Inc., Wilmington, DE (US)

(72) Inventors: Giovanni Barbarossa, Saratoga, CA (US); Christopher S. Koeppen, New Hope, PA (US); Weiqi Li, San Jose, CA (US)

(73) Assignee: II-Delaware, Inc., Wilmington, DE (US)

( * ) Notice: Subject to any disclaimer, the term of this patent is extended or adjusted under 35 U.S.C. 154(b) by 0 days.

(21) Appl. No.: 16/366,384

(22) Filed: Mar. 27, 2019

(51) Int. Cl.
*G02B 6/12* (2006.01)
*G02B 6/293* (2006.01)
*H04B 10/50* (2013.01)
*H04B 10/40* (2013.01)

(52) U.S. Cl.
CPC ...... *G02B 6/12011* (2013.01); *G02B 6/12004* (2013.01); *G02B 6/12016* (2013.01); *G02B 6/12019* (2013.01); *G02B 6/29322* (2013.01); *H04B 10/40* (2013.01); *H04B 10/505* (2013.01)

(58) Field of Classification Search
None
See application file for complete search history.

(56) References Cited

U.S. PATENT DOCUMENTS

| | | | |
|---|---|---|---|
| 6,192,058 B1 * | 2/2001 | Abeles | G02B 6/4248 359/337.11 |
| 6,415,080 B1 | 7/2002 | Sappey et al. | |
| 6,539,149 B1 | 3/2003 | Barbarossa et al. | |
| 8,285,150 B2 | 10/2012 | Bai | |
| 8,326,154 B2 * | 12/2012 | Poustie | G02B 6/12021 398/201 |
| 8,541,744 B1 | 9/2013 | Liu | |
| 8,571,410 B2 | 10/2013 | Sorin et al. | |
| 9,214,790 B2 | 12/2015 | Zheng et al. | |

(Continued)

OTHER PUBLICATIONS

Deepak, Vijayakumar, et al., "Spectral Beam Combining of a 980 nm Tapered Diode Laser Bar", Jan. 18, 2010/vol. 18, No. 2/Optics Express, pp. 893-898.

(Continued)

*Primary Examiner* — Chad H Smith
(74) *Attorney, Agent, or Firm* — Wendy W. Koba

(57) ABSTRACT

A densely-spaced wavelength division multiplexing (DWDM) transceiver utilizes a comb laser source to provide a multi-channel system capable of supporting at least twenty separate channels. The optical transmitter portion of the transceiver utilizes a double-pass (e.g., reflective) modulator configuration. The double-pass arrangement allows for a single grating (or other suitable dispersive element) to be used as a demultiplexer in combination with the comb laser source to separate the input optical beams into individual wavelength components, as well as a multiplexer for combining the plurality of separate modulated optical signals into a single, multi-channel DWDM optical output signal. The optical receiver portion of the transceiver includes a grating element to direct the multi-channel received optical signal into separate, wavelength-based channels, with the signal propagating along each channel directed into a separate photodiode.

20 Claims, 4 Drawing Sheets

(56) References Cited

U.S. PATENT DOCUMENTS

| | | |
|---|---|---|
| 9,246,628 B2 | 1/2016 | Cho et al. |
| 9,502,858 B2 | 11/2016 | Zheng et al. |
| 2004/0018018 A1* | 1/2004 | Izadpanah ........... F16K 37/0075 398/77 |
| 2004/0091199 A1 | 5/2004 | Goodfellow |
| 2006/0239609 A1 | 10/2006 | Sorin et al. |
| 2015/0236788 A1 | 8/2015 | Chanclou et al. |
| 2017/0163371 A1 | 6/2017 | Hino et al. |
| 2018/0143460 A1 | 5/2018 | Wen et al. |

OTHER PUBLICATIONS

Sanchez-Rubio, Antonio, "Wavelength Beam Combining for Power and Brightness Scaling of Laser Systems", Lincoln Laboratory Journal, vol. 20, No. 2, 2014, pp. 52-66.

* cited by examiner

MULTI-CHANNEL, DENSELY-SPACED WAVELENGTH DIVISION MULTIPLEXING TRANSCEIVER

TECHNICAL FIELD

The present invention relates to optical transceivers and, more particularly, to a densely-spaced wavelength division multiplexing (DWDM) transceiver utilizing comb laser sources to create a multi-channel transceiver system.

BACKGROUND

To date, the design of optical transceivers utilizing multi-channel DWDM have been limited by the availability of suitable light sources, multiplexers, and demultiplexers. Most of today's transceivers are configured to operate with no more than ten channels as a result of these limitations. In particular, the transmitter light sources typically comprise expensive, discrete tunable laser devices that require an additional "wavelength locking" element to stabilize and precisely control the output from each individual tunable laser. The need to utilize wavelength tuning (typically a thermal process) and wavelength stabilization/locking has limited the number of channels to no greater than ten, for reliability reasons. These systems further utilize filter-based optical structures as the separate multiplexer and demultiplexer elements, which results in a relatively high insertion loss for the system.

SUMMARY OF THE INVENTION

The need remaining in the art is addressed by the present invention, which relates to a densely-spaced wavelength division multiplexing (DWDM) transceiver utilizing a comb laser source to provide a multi-channel transmitter arrangement capable of supporting at least twenty separate channels.

An exemplary embodiment of the present invention takes the form of a multi-channel dense wavelength division multiplexed (DWDM) optical transmitter including a comb laser source configured to create an input beam supporting a plurality of N separate wavelengths, a wavelength-separating dispersive element, and a plurality of N optical modulators. The dispersive is positioned to receive as an input the input beam created by the comb laser source and demultiplex the input beam to create a plurality of N spatially separated output beams (defined as N channels), each channel supporting communication at one of the plurality of N wavelengths. The plurality of N optical modulators is disposed to receive the N optical channels, each individual optical modulator further responsive to an electrical data signal as a modulating signal input to generate a modulated optical signal. The modulators are configured as "double-pass components" (such as, for example, reflective modulators) where the optical beam is directed into and then out of the modulator along the same signal path. The output, modulated beams from the N modulators are applied as separate inputs to the same dispersive element, which functions to multiplex the plurality of N modulated optical signals together to form a multi-channel DWDM optical output signal. The multi-channel DWDM optical transmitter also includes a circulator disposed between the comb laser source and the dispersive element to direct the input beam from the comb laser source into the dispersive element, and also direct the multi-channel DWDM optical output signal into an optical output port.

Another embodiment of the present invention takes the form of a multi-channel dense wavelength division multiplexed (DWDM) optical transceiver including an optical transmitter portion as defined above, as well as an optical receiver portion including a receiver dispersive element responsive to a multi-channel received optical signal and a plurality of N photodiodes. The receiver dispersive element is oriented to spatially separate the multi-channel received optical signal into a plurality of N separate wavelength components directed along a plurality of N receiver channels. The plurality of N photodiodes is positioned to couple to the plurality N receiver channels, for recovering an electrical data signal from the applied optical signal.

Other and further embodiments and configurations of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Figure 1:
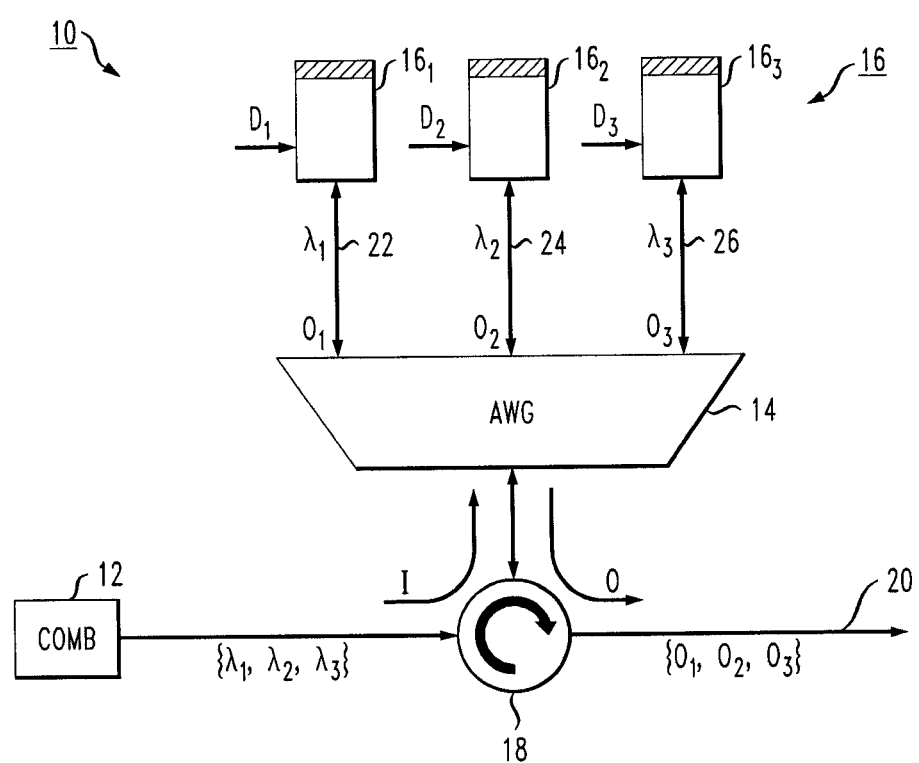
FIG. 1 is a block diagram of an exemplary DWDM optical transmitter formed in accordance with the present invention.

The operational principles of the present invention are best explained with the block diagram of FIG. 1, which depicts an exemplary multi-channel DWDM optical transmitter 10 formed in accordance with the present invention. As shown, optical transmitter 10 comprises a comb laser source 12, a dispersive element 14 and a plurality of individual optical modulators 16. In the particular embodiment of FIG. 1, dispersive element 14 takes the form of an arrayed waveguide grating (AWG), which is a particular grating configuration well-known in the art. While other grating structures, and dispersive elements in general, may be used to perform the demultiplexing/multiplexing functions in the system of the present invention, the following discussion will simply refer to "AWG 14" for the sake of convenience. The scope of the invention, however, is considered to capture all types of wavelength separation elements suitable for performing mux/demux operations.

As will be described in detail below, the plurality of individual optical modulators 16 is arranged with respect to AWG 14 to receive optical inputs at distinct (demultiplexed) wavelengths, with each optical modulator 16$i$ functioning to impress an electrical data signal on the optical carrier wavelength, and re-direct the modulated optical signal back along the same signal path therethrough and thereafter into AWG 14. In accordance with the principles of the present invention, the use of a "double-pass" optical modulator 16 allows for a compact transceiver arrangement, requiring only a single dispersive element 14 to function as both a wavelength demultiplexer and wavelength multiplexer. In the arrangement shown in FIG. 1, each double-pass modulator 16₁-16₃ is depicted as a reflective modulator. This is considered as only an exemplary embodiment. Indeed, a double-pass optical modulator may comprise a conventional transmissive modulator utilizing an additional element (or elements) to re-direct the optical signal back through the modulator. Regardless of the specific embodiment of the plurality of double-pass optical modulators 16, the created plurality of modulated optical signals exiting the modulators are subsequently applied as separate inputs to AWG 14, where they are multiplexed onto a single output signal path.

As shown in FIG. 1, a circulator 18 is included in the arrangement of transmitter 10 and is used to control the direction of the optical signal paths. That is, the optical output from comb laser source 12 (which comprises a multi-wavelength optical beam) is directed by circulator 18 into the input of AWG 14. Subsequent to the modulation of the several, distinct wavelength components within this optical beam by the plurality of optical modulators 16 and multiplexing of the modulated optical signals by AWG 14, circulator 18 directs this multiplexed, modulated optical signal from AWG 14 into an output signal port 20 of transmitter 10. In accordance with the present invention, this output signal from AWG 14 is defined as a multi-channel DWDM optical output signal.

For explanatory purposes, FIG. 1 illustrates the provision of an input optical beam I of only three individual wavelengths, denoted $\lambda_1$, $\lambda_2$, and $\lambda_3$, with the understanding that in application an input beam from comb laser source 12 may have twenty, thirty, or more separate wavelengths, with each wavelength creating a separate transmission "channel". AWG 14 functions in a well-known manner to separate (demultiplex) these wavelengths, injecting the beam operating at $\lambda_1$ along a first signal path 22, the beam operating at $\lambda_2$ along a second signal path 24, and the beam operating at $\lambda_3$ along a third signal path 26. Each signal path terminates at a separate one of the modulators 16, the arrangement of FIG. 1 showing a set of three modulators $16_1$, $16_2$, and $16_3$. In one embodiment, modulators 16 may operate with "free space" optical input signals (and thus provide "free space" modulated optical output signals). In other arrangements, optical waveguides integrated within an optical substrate, or a plurality of optical fibers, may be used to provide the signal paths between AWG 14 and the plurality of optical modulators 16.

Using techniques well-known in the art, electrical data signals (shown as $D_1$, $D_2$, ad $D_3$) are also applied as inputs to modulators 16, thus creating as outputs a set of modulated optical signals $O_1$, $O_2$, and $O_3$. Each modulated output signal therefore defining a separate transmission channel. In accordance with the present invention, the utilization of a double-pass optical modulator arrangement means that the modulated output signal will be re-directed back along the same signal path that supported the incoming light beam. Upon reaching AWG 14, the three separate modulated beams (channels) will be multiplexed together, forming a multi-beam output signal O. As mentioned above, circulator 18 is used to direct this multi-beam output signal along the output path of the device into output port 20.

There are a number of ways to create the multi-wavelength "comb" provided by laser source 12. One method may comprise a gain-block laser capable of generating a multiple wavelength spectrum output, with the output subsequently passing through a nonlinear element (referred to as an absorber section). The nonlinear element exhibits an optical absorption coefficient that decreases as a function of the intensity of the optical input beam. Therefore, only the highest intensity of the central part of the spectrum of the gain-block laser output will survive and form the output of the comb laser. The number of individual wavelength components is dependent on the properties of both the gain-block and the nonlinear element, but in general is able to create a large number of separate wavelengths (for example, from ten separate wavelengths upwards to more than 100). Thus, the utilization of a comb laser source allows for a larger number of channels to be supported in a DWDM transceiver that previously deployed in the prior art.

As mentioned above, the wavelength mux/demux component (here, shown as AWG 14) may comprise any suitable dispersive element for providing diffraction and separation of the incoming light beam into its several, individual wavelength components. The arrayed waveguide grating (AWG) configuration is a planar structure well-known in the art that functions as a wavelength multiplexer/demultiplexer. Advantageously, an AWG may be formed as part of a silicon photonic device and, perhaps, integrated with elements of the reflective modulators.

Figure 2:
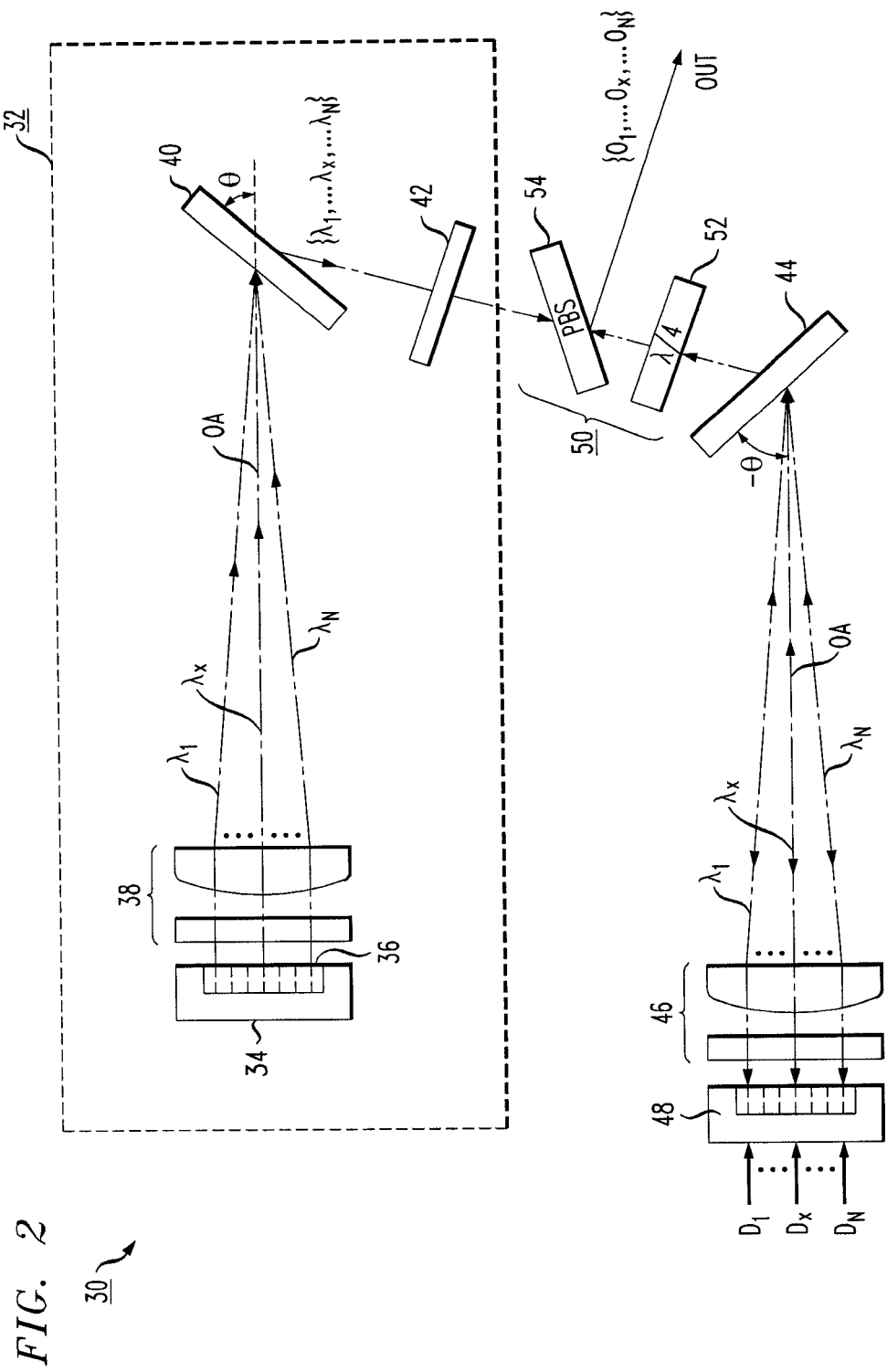
FIG. 2 illustrates an alternative embodiment of the inventive DWDM optical transmitter, in this case using wavelength beam combining (WBC) to create the comb source.

FIG. 2 illustrates an alternative embodiment of the present invention, defined as multi-channel DWDM transmitter 30. In this embodiment, a comb laser source 32 takes the form of a wavelength beam combiner (WBC) structure. In the embodiment of FIG. 2, WBC comb laser source 32 is shown as comprising a laser diode bar 34 including an array of separate emitter regions 36. The plurality of outputs from laser diode bar 34 are passed through a transformation lens arrangement 38 and focused onto a first grating 40 (in general, the gratings described in this embodiment may take the form of any suitable wavelength dispersive element). In accordance with the creation of a WBC comb laser, first grating 40 is disposed at a predetermined angle $\theta$ with respect to optical axis OA. The angle determines the degree of diffraction experienced by each individual beam, creating an associated spectral separation between adjacent beams. It is to be understood that a WBC comb laser source as utilized in accordance with the teachings of the present invention may utilize individual, discrete single mode laser sources. The use of a diode bar is exemplary only.

The set of diffracted beams formed by first grating 40 is then directed into an output coupler 42, which may comprise a highly-reflective mirror. The reflective surface of output coupler 42 thus forms an external laser cavity with laser diode bar 34, determining the lasing wavelength of each separate emitter region 36 of laser diode bar 34. The output from coupler 42 is defined as the output from WBC comb laser source 32, taking the form of a comb laser beam of multiple wavelengths. This comb laser beam is subsequently demultiplexed into individual component wavelengths (channels) by a second grating 44. As shown in FIG. 2, second grating 44 is oriented at an angle $-\theta$ to provide the desired spatial separation between the several wavelengths as required for the double-pass modulator components, described below. The separate wavelength channels subsequently pass through a second transformation lens arrangement 46 and then are applied as separate inputs to individual modulator components formed as a modulator array 48. As with the arrangement of FIG. 1, modulator array 48 is configured as a double-pass array, re-directing the group of modulated light beams back through second transformation lens arrangement 46 and through second grating 44. In this particular embodiment utilizing a WBC laser source, a free-space configuration of a reflective modulator is a preferred double-pass configuration. In this direction, second grating 44 functions as a multiplexer, combining the separate wavelength channels into a single, multi-channel output beam.

DWDM transmitter 30 is shown as also comprising a circulator 50 formed of a polarization beam splitter 52 and a quarter-wave plate 54. By passing twice through quarter-wave plate 54, multi-channel output beam will be orthogonally polarized with respect to the comb laser multi-channel input beam, and thus directed by polarization beam splitter 52 onto the output signal path.

Figure 3:
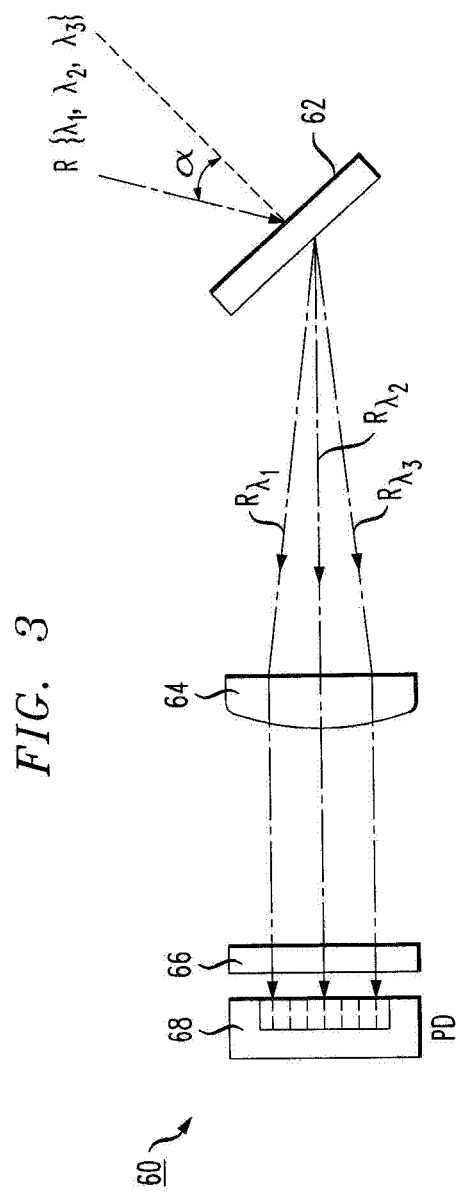
FIG. 3 illustrates an exemplary receiver arrangement that may be used with the transmitters of FIG. 1 or FIG. 2 to form a multi-channel DWDM optical transceiver in accordance with the present invention.

FIG. 3 illustrates an exemplary receiver configuration 60 that may be used with either transmitter 10 (FIG. 1) or transmitter 30 (FIG. 2). Here, an incoming recovered beam R is defined as a multiplexed beam carrying modulated signals on a set of defined wavelengths (i.e., a multi-channel DWDM received signal). Received beam R is first passed through a receiver grating 52, which demultiplexes the separate wavelengths and creates a set of modulated light signals, each operating at a different wavelength. As shown, receiver grating 52 is oriented at an angle α with respect to its optical axis OA so as to provide the desired spatial separation between wavelength components when applied to a receiving photo-detector array (mentioned below). The set of demultiplexed beams (channels) is then directed through a third transformation lens configuration 64 and focused onto a photo-detector array 66 comprising a plurality of separate photo-detectors 68. As shown, each light beam/channel is coupled into a separate photo-detector 68, to recover the associated information (modulation) signal.

Figure 4:
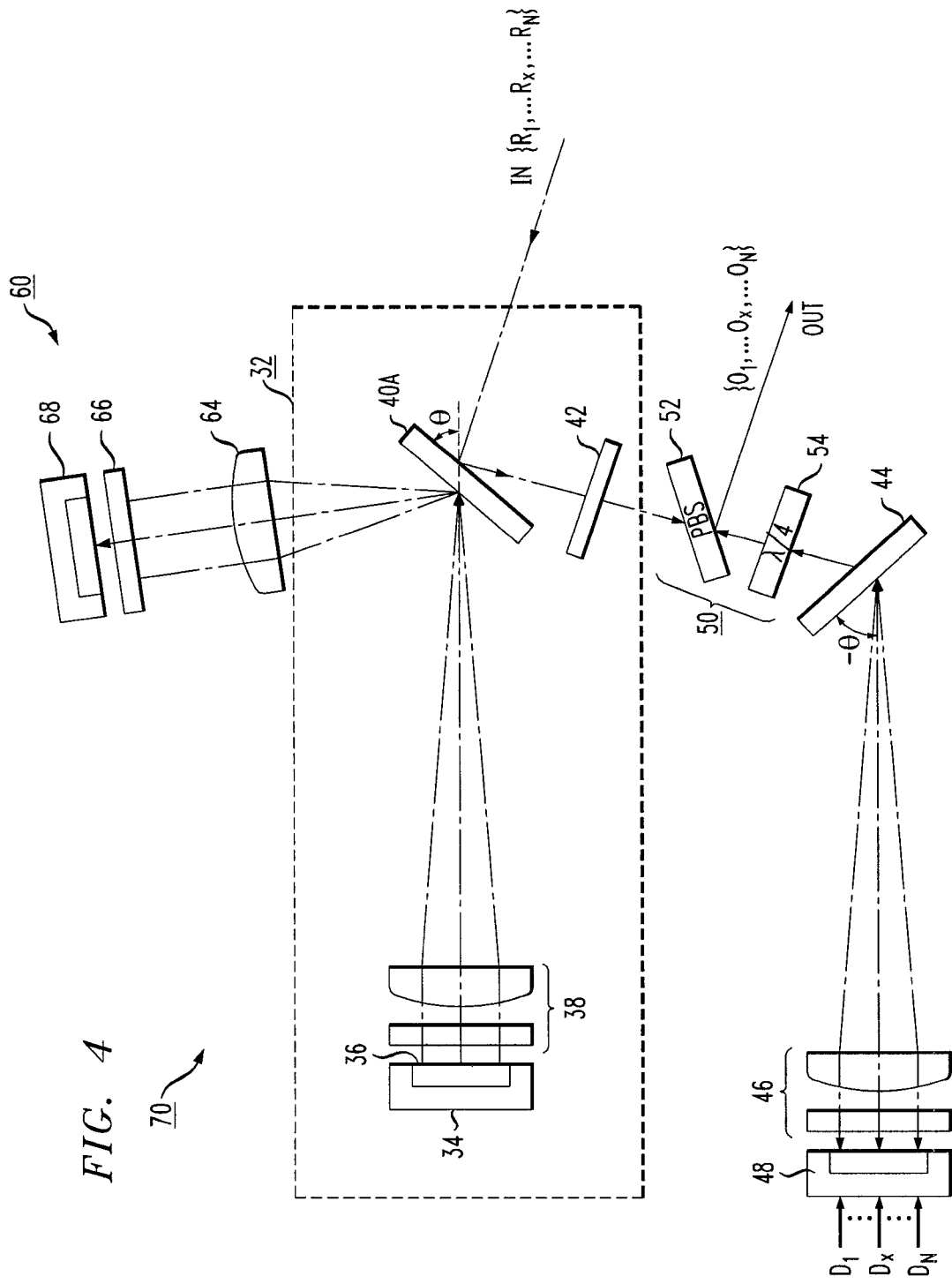
FIG. 4 illustrates an exemplary multi-channel DWDM optical transceiver incorporating the optical receiver functionality with the WBC optical transmitter functionality.

In one particular configuration, it is possible to utilize the grating element within the WBC laser comb as the demultiplexer for the receiver portion of an exemplary multi-channel DWDM transceiver formed in accordance with the present invention. This arrangement is shown as DWDM transceiver 70 in FIG. 4. The components of the WBC-based transmitter discussed above in association with FIG. 2 are identified by their same reference numerals in FIG. 4. Similarly, the components of optical receiver 60 discussed above in association with FIG. 3 are identified by their same reference numerals in FIG. 4.

In this embodiment, a first grating 40A functions as a demultiplexer for both WBC comb laser source 32 and optical receiver 60. As such, a relatively compact transceiver arrangement is provided that is able to support a larger number of wavelength channels than possible in prior art arrangements.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative, rather than restrictive, sense.

What is claimed is:

1. A multi-channel dense wavelength division multiplexed (DWDM) optical transmitter comprising:
   a comb laser source providing an input beam consisting of a plurality of N wavelengths;
   a dispersive element disposed to receive the comb laser input beam and demultiplex the plurality of N wavelengths into a plurality of N optical channels;
   a plurality of N double-pass optical modulators disposed to receive the plurality of N optical channels, each individual optical modulator further responsive to an electrical data signal as a modulating signal and creating a modulated optical signal that is returned along the associated optical channel, the plurality of N modulated optical signals applied as separate inputs to the dispersive element, wherein the dispersive element multiplexes the plurality of N modulated optical signals to form a multi-channel DWDM optical output signal; and
   a circulator disposed between the comb laser source and the dispersive element to direct the input beam from the comb laser source into the dispersive element, and direct the multi-channel DWDM optical output signal into an optical output port.

2. The multi-channel DWDM optical transmitter as defined in claim 1 wherein the comb laser source comprises
   a pulsed laser generating short optical pulses; and
   a nonlinear optical element disposed to receive the optical pulses and produce therefrom the input beam consisting of the plurality of N separate wavelengths, wherein defined values of the plurality of N separate wavelengths is based upon an optical absorption coefficient of the nonlinear optical element.

3. The multi-channel DWDM optical transmitter as defined in claim 1 wherein the comb laser source comprises a wavelength beam combiner (WBC) arrangement.

4. The multi-channel DWDM optical transmitter as defined in claim 3 wherein the WBC arrangement comprises
   a one-dimensional array of N laser sources;
   a WBC dispersive element disposed to receive a plurality of N optical beams from the laser diode bar array of N emitter regions, the WBC dispersive element oriented to combine the plurality of N optical beams into a single multiplexed beam; and
   a reflective output coupler disposed to receive the single multiplexed beam, wherein the reflective output coupler creates an external cavity with the laser diode bar such that each separate one of the plurality of N optical beams resonates at a different wavelength as a function of the orientation of the WBC dispersive element, creating as an output from the reflective optical coupler the comb laser source input beam supporting a plurality of N separate wavelengths.

5. The multi-channel DWDM optical transmitter as defined in claim 4 wherein the one-dimensional array of N laser sources comprises at least one single mode laser source.

6. The multi-channel DWDM optical transmitter as defined in claim 4 wherein the one-dimensional array of N laser sources comprises a laser diode bar including a one-dimensional array of N emitter regions.

7. The multi-channel DWDM optical transmitter as defined in claim 4 wherein the WBC dispersive element comprises a grating.

8. The multi-channel DWDM optical transmitter as defined in claim 7 wherein the grating comprises an arrayed waveguide grating.

9. The multi-channel DWDM optical transmitter as defined in claim 4 wherein the WBC arrangement further comprises
   a transformation lens configuration disposed between the laser diode bar and the WBC grating element.

10. The multi-channel DWDM optical transmitter as defined in claim 1 wherein the circulator comprises
    a polarization beam-splitting element disposed at the output of the comb laser source; and
    a quarter-wave plate disposed between the polarization beam-splitting element and the dispersive element.

11. The multi-channel DWDM optical transmitter as defined in claim 1 wherein the plurality of N double-pass optical modulators comprises a plurality of N reflective optical modulators.

12. The multi-channel DWDM optical transmitter as defined in claim 1 wherein the plurality of N double-pass optical modulators comprises a plurality of N transmissive optical modulators, each transmissive optical modulator coupled to an external device for returning a modulated output signal into the transmissive optical modulator.

13. The multi-channel DWDM optical transmitter as defined in claim 1 wherein the plurality of N double-pass optical modulators is configured as a modulator array.

14. The multi-channel DWDM optical transmitter as defined in claim 1 wherein the plurality of N double-pass optical modulators comprises a plurality of N double-pass free-space optical modulators.

15. The multi-channel DWDM optical transmitter of claim 1 wherein N is no less than 20.

16. A multi-channel dense wavelength division multiplexed (DWDM) optical transceiver including:
   an optical transmitter comprising:
      a comb laser source providing an input beam consisting of a plurality of N wavelengths;
      a dispersive element disposed to receive the comb laser input beam and demultiplex the plurality of N wavelengths into a plurality of N optical channels;
         a plurality of N double-pass optical modulators disposed to receive the plurality of N optical channels, each individual optical modulator further responsive to an electrical data signal as a modulating signal and creating a modulated optical signal that is returned along the associated optical channel, the plurality of N modulated optical signals applied as separate inputs to the dispersive element, wherein the dispersive element multiplexes the plurality of N modulated optical signals to form a multi-channel DWDM optical output signal; and
      a circulator disposed between the comb laser source and the dispersive element to direct the input beam from the comb laser source into the dispersive element, and direct the multi-channel DWDM optical output signal into an optical output port; and
   an optical receiver comprising:
      a receiver dispersive element responsive to a multi-channel received optical signal and oriented to spatially separate the multi-channel received optical signal into a plurality of N wavelength components; and
      a plurality of N photodiodes, each photodiode disposed to receive a separate one of the plurality of N wavelength components and recover an electrical data signal therefrom.

17. The multi-channel DWDM optical transceiver of claim 16, wherein the optical receiver further comprises a transformation lensing arrangement disposed between the receiver dispersive element and the plurality of N photodiodes.

18. The multi-channel DWDM optical transceiver of claim 16, wherein the plurality of N photodiodes is configured as a photodiode array of N elements.

19. The multi-channel DWDM optical transceiver of claim 16 wherein N is no less than 20.

20. The multi-channel DWDM optical transceiver of claim 16 wherein the dispersive element comprises an arrayed waveguide grating.

* * * * *